May 4, 1965 R. A. BILBREY 3,181,496
VISUAL INDICATOR
Filed Jan. 20, 1964
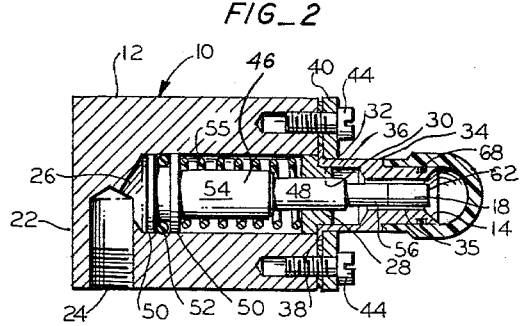
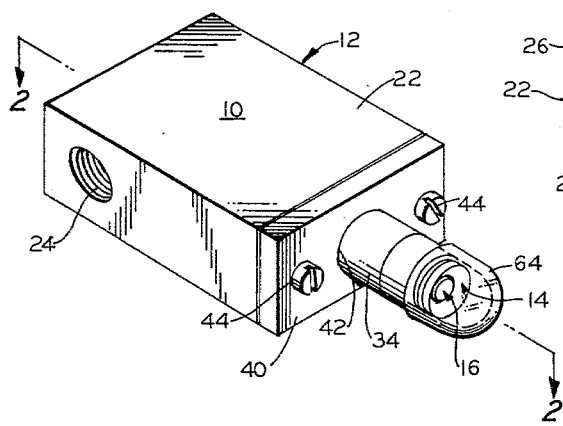
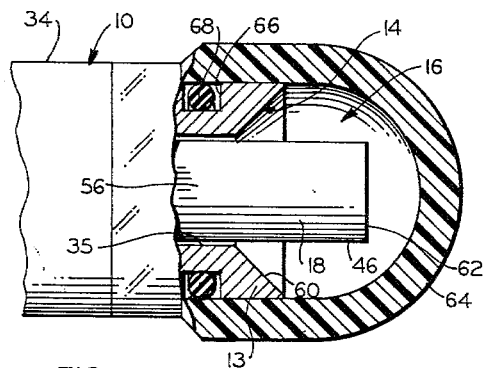
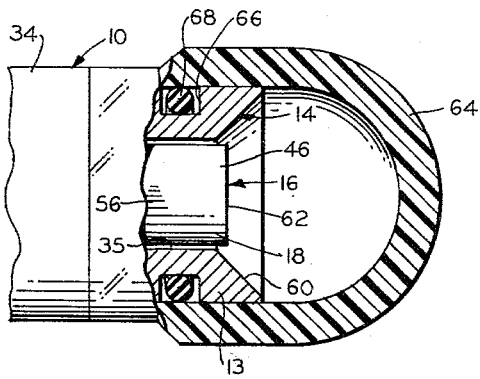
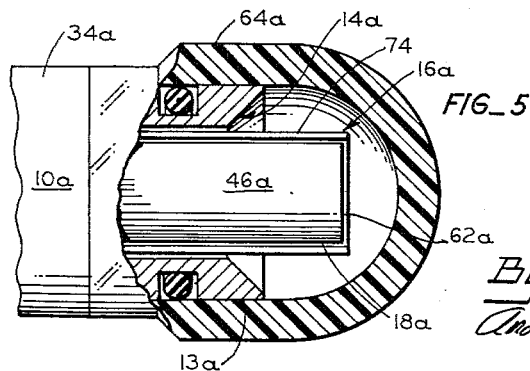
Inventor
ROBERT A. BILBREY
By
Anderson Luedeka, Fitch, Even & Tabin
Atty's

United States Patent Office 3,181,496
Patented May 4, 1965

3,181,496
VISUAL INDICATOR
Robert A. Bilbrey, Kensington, Calif., assignor to Benjamin W. West, doing business as California Controls Company, Oakland, Calif.
Filed Jan. 20, 1964, Ser. No. 338,716
3 Claims. (Cl. 116—70)

The present invention relates generally to a visual indicator and more particularly to a visual indicator wherein the exposure of a colored surface to a reflecting surface produces a highly visible signal or visual image.

Visual indicators are widely used in control systems to indicate the operating conditions of the system. Many of such indicators involve the use of electric lights. In addition to the possibility of bulbs burning out, there are problems of malfunctioning of electric circuitry. Further, there is the need for connection to a source of electrical power.

Other prior art devices have utilized the mechanical movement of parts to expose or change the color of a surface. Such prior art indicators have been inadequate for various applications. Some of these devices require particular attention and good conditions of lighting to prevent their signals or indications from going unnoticed. Also, some provide visibility or viewability only when viewed from certain positions or directions. Further, many of these devices are bulky, expensive and/or complicated so as to be subject to problems of malfunctioning.

It is accordingly a primary object of the present invention to provide an improved visual indicator. It is a more specific object of this invention to provide an improved simple, effective and dependable visual indicator which operates through the exposure of a colored surface to a reflecting surface.

It is a further object of this invention to provide such an improved indicator which provides a satisfactory signal in semidark or marginal lighting situations.

It is a further object of this invention to provide an improved visual indicator which will provide a satisfactory signal as viewed from a wide range of positions.

It is still another object of this invention to provide a compact, simple visual indicator which is economical to produce and maintain and which is rugged and durable in operation.

Other objects and advantages of the present invention will become apparent from the following description and the accompanying drawings, wherein:

FIGURE 1 is a perspective view of a pneumatically actuated visual indicator embodying various features of the present invention;

FIGURE 2 is a side-sectional view of the indicator taken generally along line 2—2 FIGURE 1;

FIGURE 3 is an enlarged side view, with portions broken away, of a part of the visual indicator shown in FIGURES 1 and 2, showing the indicator in an "off" or non-indicating position;

FIGURE 4 is an enlarged side view similar to FIGURE 3, showing the visual indicator in a "signalling" or indicating position; and FIGURE 5 is a modified form of visual indicator.

One preferred form of visual indicator is illustrated in FIGURES 1 through 4 of the drawings. This indicator 10 includes a housing 12 having a reflecting portion 13 at the forward end thereof to provide a tubular, outwardly flared reflecting surface 14. A generally cylindrical indicator element 46 is axially aligned with the reflecting surface 14 and arranged for axial movement in a passageway in the housing 12. When the indicator is actuated, the indicator element 46 is moved from a rearward position where the indicator element does not appreciably extend into the interior of the reflecting portion 13 of the housing to a forward position where the indicator element extends at least partially through the reflecting portion of the housing. The side wall or surface 18 of the indicator element adjacent to its forward end, which thus becomes exposed to the reflecting surface 14, is a color that visually contrasts with the normal color of the reflecting surface. A vivid color such as fluorescent paint which will be readily reflected by the reflecting surface is particularly desirable for the wall of the indicator element. This colored surface 18 of the indicator element 46 is not visible so long as the indicator is not actuated. When the indicator is actuated, the indicator element is extended and the colored surface 18 is visible both directly and by reflection of the color by the reflecting surface. Thus, a highly visible signal or indication is produced. The signal is normally visible from directly in front of the indicator as well as other points in essentially a 180° hemisphere around it.

As shown best in FIGURES 1 and 2, the housing 12 for the preferred form of indicator 10 comprises a generally rectangular housing block 22 of metal, plastic or other suitable material that has a generally cylindrical passageway, bore or cavity 26 extending into the block from its side which faces forwardly of the indicator 10. Indicator means 16 for the indicator are received in the passageway 26. The block 22 is provided adjacent its rearward end with a bore, cavity or passageway 24 adapted to communicate with a line or supply of fluid such as air. Change in the pressure of the fluid serves to actuate the indicator 10. The passageway 26 extends generally centrally of the block 22, communicating at its rearward or innermost end with the innermost end of the passageway 24. At the outermost or forward end of the passageway 26 is fixedly positioned a generally cylindrical bushing or sleeve 28 which has a cylindrical center aperture 30. The portion or section 32 of the bushing 28 which extends outwardly or forwardly of the block 22 has a reduced diameter.

In the illustrated visual indicator 10, the housing 12 also includes a tubular or hollow generally cylindrical housing extension or cylinder 34 that also receives the indicator means 16. One end of the cylinder 34 is secured to the forward end of the block 22 over the opening to the passageway 26 and the cylinder extends forwardly therefrom. The housing cylinder 34 includes the reflecting portion 13 at its outermost or forward end. The reflecting portion 13 provides the tubular, outwardly flared, forwardly facing reflecting surface 14 that is generally co-axial with the housing cylinder 34. The cylinder 34 is provided with an axially extending, central, generally cylindrical passageway, cavity or bore 35 that is thus axially aligned with the tubular reflecting surface 14. The inner or rearward end of the passageway 35 is enlarged to provide an internal bore section 36 that fits over the reduced diameter section 32 of the bushing 28. That end of the cylinder 34 is also provided with an external annular flange 38. A generally rectangular clamp plate 40 serves to hold the cylinder 34 to the block 22. In particular, the cylinder 34 extends through a mating circular aperture 42 in the clamp plate 40, while the plate 40 is secured to the block 22 as by means screws 44. Thus, the annular flange 38 at the end of the cylinder 34 is held between the block 22 and the clamp plate 40 to secure the housing cylinder in position.

The generally cylindrical indicator element or plunger 46 is movably supported within the elongated passageway provided by the passageway or bore 26 in the housing block 22, the passageway or bore 35 of the housing cylinder 34, and the bore 30 of bushing 28. The indicator element or plunger 46 is supported in the passageway for reciprocating or longitudinal movement and comprises the movable indicator means 16 of the preferred form of visual indicator 10. The indicator element or plunger may be of any suitable material such as metal or plastic.

More specifically, an intermediate section 48 of the illustrated plunger 46 is slideably received within the center aperture 30 of the bushing 28. Located at the rear end of plunger 46 innermost of the passageway 26 are a pair of spaced-apart annular flanges 50. The flanges 50 provide a sliding fit for the rear end of the plunger within the passageway 26. An O ring 52 is disposed around the plunger 46 betwen the flanges 50 to seal, as the plunger reciprocates, the rear or innermost end of the passageway 26 (which communicates with the passageway 24) from the portion of the passageway 26 on the opposite or forward side of the flanges 50.

The indicator element or plunger 46 will normally be disposed in the first or rearward non-indicating or "rest" position shown best in FIGURES 2 and 3. Section 54 of the plunger 46, which is the section located between the flanges 50 and the intermediate section 48, is of a larger diameter than the intermediate section 48. It is also larger than the aperture 30 in the bushing 28. Thus when the plunger 46 moves outwardly or forwardly of the passageway 26, the shoulder provided by the outermost end of the enlarged section 54 may provide a mechanical stop to the movement of the plunger by abutting against the rear wall of the bushing 28.

In the illustrated structure, biasing means are provided by a spiral spring 55 that is disposed around the plunger 46 between the outermost or forward of flange 50 and the bushing 28 to urge or bias the plunger to the first rearward position shown generally in FIGURES 2 and 3. Depending upon the dimensions of the spring 55 and the location of the shoulder of the enlarged section 54 of the plunger, the spring 55 may itself act as the stop limiting outward or forward movement of the plunger 46.

The forward or outermost end 56 of the plunger 46 has a reduced diameter relative to the intermediate section 48. The axial passageway 35 of the housing cylinder 34 forwardly of the bore 36 has a smaller diameter than the bore 36 and receives the forward end 56 of the plunger 46 for movement therein.

The outermost or forward end of the cylindrical passageway 35 is flared outwardly in the forward direction to provide a conical surface 60 that is axially aligned with the passageway and the housing cylinder 34. Thus, the conical surface 60 merges into the cylindrical passageway 35 at its rearward smaller end and it is thereby provided with a central aperture from which extends an axial passageway. The forward end of the housing cylinder that has the conical surface 60 comprises the reflecting portion 13 of the housing and is constructed to provide the tubular, outwardly flared reflecting surface 14. This may be accomplished by any suitable means, as by constructing the reflecting portion 13 of a material such as a hard metal and polishing the conical surface 60 to provide a mirror or reflecting surface. A reflecting surface might also be provided by placing a coating, plating or covering of reflecting material such as chrome over a conical base of any suitable material such as brass. The reflecting surface 14 comprises the reflecting means of the illustrated visual indicator 10.

With regard to the illustrated plunger 46, and as noted above, the first or rearward position shown in FIGURES 2 and 3 is the non-indicating or "rest" position to which the plunger is normally biased by the coil spring 55. When in this position, the outermost or forward end surface 62 of the plunger 46 is generally adjacent to or aligned with the rear portion of the reflecting surface 14. When in this position, no signal is to be given, and so the forward or outer end surface 62 of the plunger 46 is desirably treated in a manner corresponding to that of the conical surface 60 or it may be provided merely with a neutral or non-contrasting color. Thus for example, the forward end surface 62 may be a reflecting surface or it may be a color such as silver, grey, white, black or beige.

The sides of the forward or outermost end 56 of the indicator element or plunger 46 are colored. More particularly, the cylindrical wall of the forward end 56 of the plunger is provided with a bright colored surface 18. This colored portion or surface of the plunger 46 is not visible to any appreciable extent when the plunger is in the rearward "rest" position as shown in FIGURES 2 and 3. The colored sides or wall of the end 56 are exposed or made visible when the plunger is moved outwardly or forwardly, incident to the actuation of the indicator 10, to an outward or forward position such as shown in FIGURE 4.

Thus, the colored sides or wall of the plunger end 56 provide the colored surface 18 of the indicator means 16 and the colored surface is exposed to the reflecting surface 14 when the indicator 10 is actuated. The colored sides or wall may be viewed directly, but in addition there is substantial reflection from the reflecting surface 14, which will take on the coloration of the colored surface, to increase the visibility of the signal when the indicator is actuated. It is preferable that a color which is vivid and sharply contrasting to the normal color of the reflector surface and to the end surface of the plunger be used for the sides of the plunger end 56 to provide a more highly visible signal. Examples of possible vivid and contrasting colors are red, yellow, blue, or green. Very satisfactory results have been achieved by wrapping the cylindrical wall of the plunger adjacent its forward end with tape having a vivid red coating of a luminous or glowing material, such tape being sold under the trademark "Scotchlite."

The indicator is enclosed and protected by a transparent lens 64 of plastic, glass or the like, which is secured over the outer or forward end of the housing cylinder 34. The lens 64 is in generally a hollow cylinder that is closed at its outer or forward end in a spherical configuration. The outer or forward end of the housing cylinder 34 has a reduced external diameter to receive the open rearward end of the lens 64. That outer or forward end of the cylinder 34 is also provided with an annular groove 66 which receives an O ring 68 for frictionally retaining the lens 64 on the cylinder 34.

The operation of the illustarted indicator 10 may now be more readily understood. As described above, the plunger 46 is normally positioned, under the bias of the spring 55, in the withdrawn first or rearward position shown in FIGURES 2 and 3. As shown best in FIGURE 3, the forward end 56 of the plunger, which is provided with the colored sides, is thereby positioned within the cylinder 34 so that the colored sides cannot be seen by an operator viewing the indicator 10. The portion of the plunger which can be seen is the forward end surface 62, that is of a generally neutral color so that no signal is presented by the indicator 10.

When the predetermined fluid pressure for actuation of the indicator is exerted through the passageway 24 against the innermost or rearward end surface of the plunger 56, the indicator element or plunger will be urged, against the force of the biasing spring 55, outwardly or forwardly in the passageway in the housing. The dimensions and characteristics of the biasing spring 55 as well as the dimensions of the plunger may be selected so that the predetermined pressure will serve to move the plunger 46 against the biasing spring the desired distance. When the indicator 10 is actuated, the outermost or forward end 56 of the plunger extends at least partially through the reflecting portion 13 of the housing and the conical area defined by the conical reflecting surface 14, positioning the colored surface 18 within that area and exposing it directly to the reflecting surface. FIGURE 4 illustrates an actuated, outwardly or forwardly extended position of the plunger 46 where the indicator element or plunger extends through and beyond the reflecting portion of the housing. When the indicator 10 is actuated, the colored surface 18 is directly visible, and further, the color is reflected by the reflecting surface 14, with the reflecting surface being given a highly visible coloration.

In the operation of the illustrated indicator 10, when the fluid pressure is sufficiently reduced, the spring 55 will automatically return the plunger to an "off" or non-indicating position (FIGURES 2 and 3). In some applications it may be desirable as an alternative to eliminate the spring or other biasing means so that if the plunger is actuated at any time it will remain in the signaling position despite subsequent reduction of pressure.

It is further obvious that there are many alternatives to the specific structure illustrated which would be within the spirit and scope of the invention. Merely by way of example, the plunger might be biased by fluid pressure against the force of a spring, with the indicator being actuated by a reduction of the fluid pressure which allows the spring to urge the plunger into a signaling position. Similarly, the movable indicator means could be actuated mechanically or electrically as by means, for example, of a solenoid. While in the illustrated device the reflecting surface is fixed while the colored surface moves relative to it, it would also be within the scope of the invention to move the reflecting surface relative to a fixed color surface or to move both of the surfaces relative to one another. The invention similarly contemplates normally providing a signal with a stop of the signal being the indication.

Another example of a modified form of the invention, where neither the colored surface nor the reflecting surface moves but an interposed shield is moved, is shown in FIGURE 5. Parts of this embodiment which generally correspond to parts in visual indicator 10 are given the same numbers with an "a" suffix. Thus, in visual indicator 10a a colored surface 18a is provided at the forward end of an indicator element 46a, however, the element is not movable but is fixed in an extended or forward position. The element 46a is disposed axially of a conical reflecting surface 14a. Normally disposed around the element 46a is a tubular, movable shield or part 74. The element 46a and the shield 74 comprise the indicator means 16a for indicator 10a. The shield 74 is thus normally interposed between the colored surface 18a and the reflecting surface 14a so as to cover the colored surface against direct view and to also prevent its reflection by the reflecting surface. The movable shield 74 is moved rearwardly when the indicator 10a is actuated to expose the colored surface 18a to the reflecting surface 14a as well as to direct view. This produces a highly visible color signal when the indicator is actuated. In other respects, the indicator 10a may be generally similar to the illustrated indicator 10, except that the movement is rearward rather than forward when the indicator is actuated.

Thus, a compact, simple and economical visual indicator is provided. The visual signal from this indicator may be viewed from various angles and is readily observed.

Various modifications and changes in addition to those noted above may be made without departing from the spirit and scope of the present invention. Various features of the invention are set forth in the following claims.

What is claimed is:

1. A visual indicator comprising, an outwardly flared generally conically shaped reflecting surface having a centrally located aperture extending therethrough, said reflecting surface defining a reflecting zone, a movable elongated indicator element having a brightly colored sidewall and an end wall of a contrasting color mounted for axial movement through said aperture between an extended position wherein said indicator element extends through said aperture into said reflecting zone with a portion of said indicator extending beyond said reflecting surface and out of said reflecting zone, and a retracted position wherein said indicator element does not extend into said reflecting zone, and means for effecting relative movement between said reflecting surface and said indicator element, whereby movement of said indicator element between said extended position and said retracted position provide a visual color signal.

2. A visual indicator comprising, an outwardly flared generally conically shaped reflecting surface having a centrally located aperture extending therethrough, said reflecting surface defining a reflecting zone, a movable elongated indicator element having a brightly colored sidewall and an end wall of a contrasting color mounted for axial movement through said aperture between a retracted position wherein said indicator element does not extend into said reflecting zone and an extended position wherein said indicator element extends through said aperture into said reflecting zone with a portion of said indicator extending beyond said reflecting surface and out of said reflecting zone, means biasing said indicator element toward said retracted position, and means responsive to a signal for urging said indicator element toward said extended position with a force sufficient to overcome said biasing force, whereby a visual direct and reflected color signal is provided.

3. A visual indicator comprising, a housing having a generally cylindrical passageway therein, an outwardly flared generally conically shaped reflecting surface having a centrally located aperture extending therethrough adjacent the exit from said passageway and concentric therewith, said reflecting surface defining a reflecting zone, a movable elongated cylindrical indicator element having a brightly colored sidewall and an end wall of a contrasting color disposed in said passageway for axial movement through said aperture between a retracted position wherein said indicator element does not extend into said reflecting zone and an extended position wherein said indicator element extends through said aperture into said reflecting zone with a portion of said indicator extending beyond said reflecting surface and out of said reflecting zone, means biasing said indicator element inwardly of said passageway into said retracted position, and conduit means connected to said passageway for applying fluid pressure to said indicator element responsive to a signal to overcome said biasing means and urge said indicator element into said extended position, whereby a visual direct and reflected color signal is provided.

References Cited by the Examiner
UNITED STATES PATENTS

| | | | |
|---|---|---|---|
| 2,263,840 | 11/41 | Franck | 116—114 |
| 2,616,941 | 11/52 | Lasko | 116—118 |
| 2,756,715 | 7/56 | Harks | 116—118 |
| 3,011,470 | 12/61 | Stoermer | 116—70 |

LOUIS J. CAPOZI, *Primary Examiner.*